Patented Feb. 1, 1949

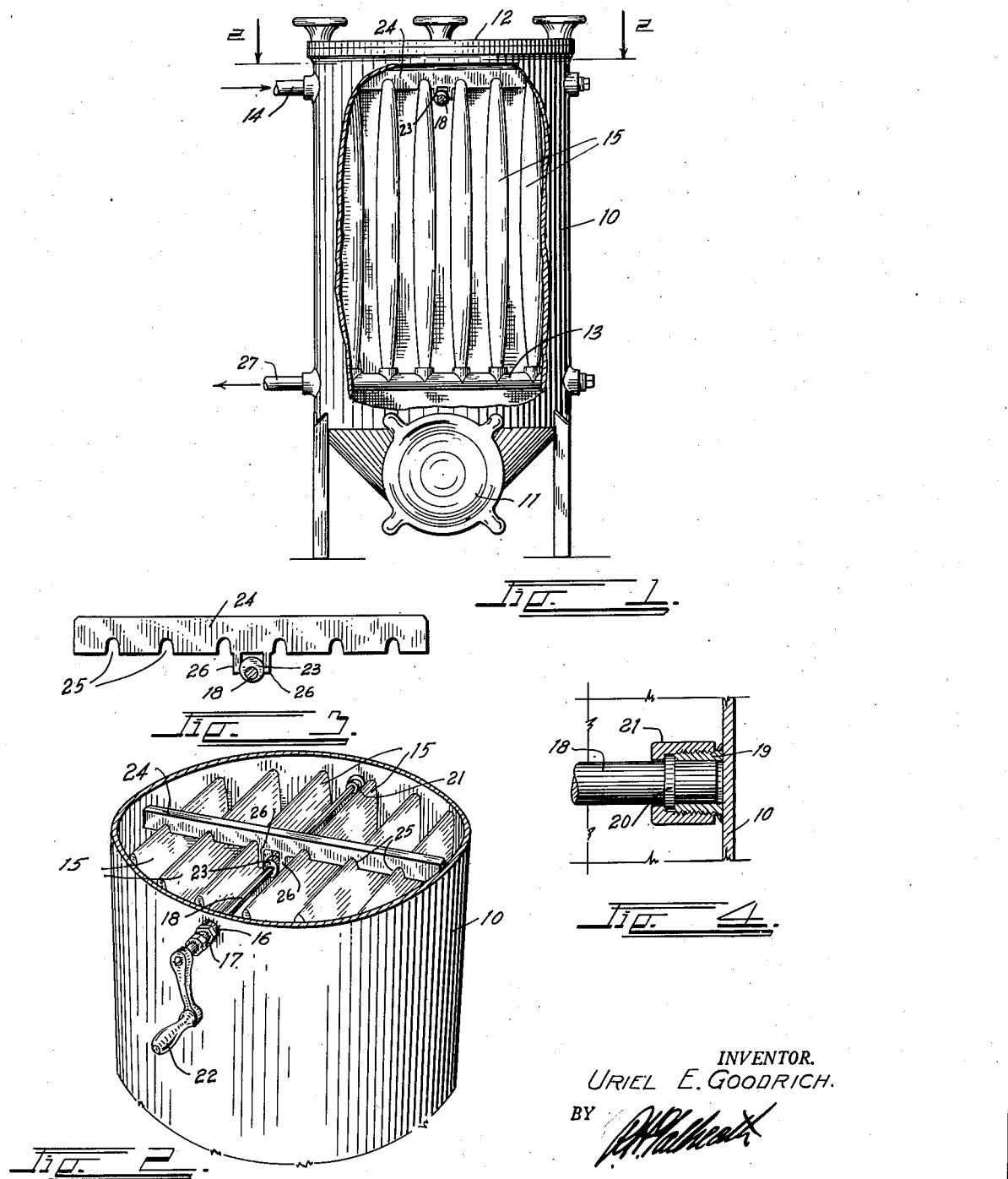

2,460,416

UNITED STATES PATENT OFFICE 2,460,416

SCREEN CLEANER FOR PRESSURE FILTERS

Uriel E. Goodrich, Laramie, Wyo.

Application September 21, 1945, Serial No. 617,849

2 Claims. (Cl. 210—182)

This invention relates to a filter cleaner and is more particularly designed for use on the type of pressure filters employed in dry cleaning establishments for filtering the cleaning solution from the washer.

The principal object of the invention is to provide a simple and highly efficient device which can be quickly and easily applied to any dry cleaner's pressure filter and which, when operated, will vibrate the filter screens therein to loosen adhering foreign matter so that the latter may settle to the bottom of the filter.

Another object of the invention is to provide a device of this character which will not interfere with the normal use of the filter and which can be operated while the filter is in operation.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a typical dry cleaner's pressure filter with the side thereof broken away to illustrate the internal mechanism;

Fig. 2 is a fragmentary perspective view illustrating the improved filter cleaner in place in the filter;

Fig. 3 is a detail view of the shaker bar employed in the improved cleaner; and

Fig. 4 is an enlarged detail section illustrating one of the bearings employed in the improved filter cleaner.

In Fig. 1 a typical filter housing is illustrated at 10, with its clean-out at 11, lid at 12, outlet manifold at 13, inlet at 14, filter screens at 15, and discharge at 27.

The improved filter cleaner is applied to the above filter by drilling a single hole through one side of the housing 10 between the innermost filter screens 15 and adjacent the top thereof. A nipple 16 is welded about the threaded hole to receive a suitable stuffing gland 17. A shaft 18 is passed through the stuffing gland 17 and the nipple 16 into the interior of the housing 10.

The shaft 18 extends parallel to the planes of the filter screens 15 and terminates in a bearing sleeve 19, which is welded or otherwise secured to the inner face of the opposite wall of the housing 10, as shown in detail in Fig. 4. The shaft 18 is provided with a shoulder 20 adjacent its inner extremity, and a cap 21 is threaded on the sleeve 19 so as to overlap the shoulder 20 and hold the extremity of the shaft 18 in place in the sleeve.

The projecting extremity of the shaft 18 carries a suitable hand crank 22, by means of which it may be rotated from the exterior of the housing 10. An eccentric cam is mounted on the shaft 18 at the middle of the housing 10.

A shaker bar 24 overlaps, and rests by gravity on, the top edges of all of the filter screens 15, the bar being provided with suitable notches 25 in its bottom edge for overlapping the upper edges of the screens. This shaker bar is formed with two cam arms 26 at its middle which extend downwardly on each side of the cam 23.

In use, the solution to be filtered enters the intake 14 and flows through the filter screens 15 into the hollow interior thereof, then descends into the outlet manifold 13 and discharges from the discharge 27. All of the lint and other foreign matter in the solution piles upon the filter screens 15. This deposit restricts the flow of solution and interferes with efficient filtering action.

It can be readily seen if the hand crank is rapidly rotated at intervals, it will, through the action of the eccentric 23, reciprocate the shaker bar 24. The latter, due to the notches 25 fitting the filter screens, will impart a rapid vibration to the screens, which loosens the accumulated material and allows it to settle to the clean-out 11.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for cleaning filter screens of the flat, vertical, parallel, separated type used in dry cleaners' pressure filters comprising: a horizontal shaker bar lying across the upper edges of all of said screens at right angles to the planes thereof, there being notches in the lower edge of said shaker bar for receiving the upper edges of said filter screens; a shaft extending across said filter at right angles to said shaker bar; means on said shaft for imparting a longitudinal and horizontal reciprocation to said shaker bar; and means for rotating said shaft from the exterior of said filter.

2. A device for cleaning filter screens of the flat, vertical, parallel, separated type used in dry cleaners' pressure filters comprising: a horizontal shaker bar lying across the upper edges of all of said screens at right angles to the planes thereof, there being notches in the lower edge of said shaker bar for receiving the upper edges of said filter screen; a horizontal shaft extending across said filter at right angles to and below said shaker bar; an eccentric member on said shaft at its point of intersection with said shaker bar; means on said shaker bar engaging said eccentric member; and means for rotating said shaft from the exterior of said filter to cause said eccentric to reciprocate said shaker bar horizontally.

URIEL E. GOODRICH.

REFERENCES CITED

The following references are of record in the file of this patent:

UNITED STATES PATENTS

| Number | Name | Date |
|---|---|---|
| 820,434 | McMyler | May 15, 1906 |
| 971,013 | Smith | Sept. 20, 1910 |
| 2,024,426 | Butler | Dec. 17, 1935 |
| 2,318,395 | Hornbrook | May 4, 1943 |

FOREIGN PATENTS

| Number | Country | Date |
|---|---|---|
| 734,420 | France | Aug. 1, 1932 |